(12) United States Patent
Chueh

(10) Patent No.: US 7,243,568 B2
(45) Date of Patent: Jul. 17, 2007

(54) TRANSMISSION DEVICE CAPABLE OF CHANGING SPEED WITH STORED ENERGY

(75) Inventor: Chuang-Hua Chueh, Hsin Chu (TW)

(73) Assignee: Avision Inc., Hsinchu (TW)

( * ) Notice: Subject to any disclaimer, the term of this patent is extended or adjusted under 35 U.S.C. 154(b) by 277 days.

(21) Appl. No.: 11/032,143

(22) Filed: Jan. 11, 2005

(65) Prior Publication Data
US 2005/0150320 A1      Jul. 14, 2005

(30) Foreign Application Priority Data
Jan. 14, 2004   (TW) ............................... 93100933 A

(51) Int. Cl.
    *F16H 3/34* (2006.01)
(52) U.S. Cl. ........................ 74/354; 358/415
(58) Field of Classification Search ........... 198/468.01, 198/468.9; 358/412, 415, 486, 505; 74/340, 74/352, 353, 354, 473.3
See application file for complete search history.

(56) References Cited

U.S. PATENT DOCUMENTS 2,587,145 A * 2/1952 Grib ........................... 346/113
6,189,395 B1 2/2001 Lee
6,244,124 B1 6/2001 Lee
6,366,343 B1 4/2002 Lee
6,626,057 B1 9/2003 Fang
2003/0081271 A1 * 5/2003 Chien ........................ 358/486

FOREIGN PATENT DOCUMENTS

TW              541828 A4     12/1990

* cited by examiner

*Primary Examiner*—Saul Rodriguez
*Assistant Examiner*—Derek D. Knight

(57) ABSTRACT

A transmission device capable of changing speed with stored energy drives a carriage to move back and forth. The transmission device includes a variable speed transmission mechanism mounted on a base and driven by a motor. A first energy storage mechanism mounted on the variable speed transmission mechanism cooperates with a first latch mechanism mounted on the base so as to store and release the energy of the driven carriage, switch the output of the variable speed transmission mechanism, and thus switch the moving speed of the carriage.

11 Claims, 7 Drawing Sheets

TRANSMISSION DEVICE CAPABLE OF CHANGING SPEED WITH STORED ENERGY

BACKGROUND OF THE INVENTION

1. Field of the Invention

The invention relates to a variable speed transmission device, and more particularly to a transmission device capable of changing speed with stored energy.

2. Description of the Related Art

Conventional speed-changing devices usually shift a relative position between some gears in a gear set with the extra manpower or motor power so as to produce different engagement conditions and transmission paths and thus to achieve the object of changing the gear ratio.

Taiwan Patent Publication No. 541828 and U.S. Pat. Nos. 6,189,395; 6,244,124; 6,626,057; and 6,366,343, which respectively correspond to Taiwan Patent Publication Nos. 421401; 426290; 462568; and 476213 have disclosed speed-changing mechanisms for scanners in order to provide required speeds for the scanners to perform a high-resolution scanning process and a low-resolution scanning process. However, these prior arts still have to change the speed with the extra motor power. A motor control circuit for an additional motor has to be provided in order to provide the power for changing the speed. Thus, the apparatus cost is increased, a relatively large space is occupied, and the power-saving requirement cannot be satisfied because the extra power has to be consumed.

Therefore, it is an important object of the invention to provide a transmission device capable of changing speed without an extra motor power source.

SUMMARY OF THE INVENTION

It is therefore an object of the invention to provide a transmission device capable of changing speed with stored energy without the action of extra drive power of a motor or manpower.

The invention achieves the above-identified object by providing a transmission device for driving a carriage to move back and forth between a first position and a second position. The transmission device includes a base, a motor mounted on the base, a variable speed transmission mechanism mounted on the base, a first energy storage mechanism mounted on the variable speed transmission mechanism, and a first latch mechanism mounted on the base. The variable speed transmission mechanism is driven by the motor and has a first state for moving the carriage with a first speed and a second state for moving the carriage with a second speed. The first state and the first speed are respectively different from the second state and the second speed. The first energy storage mechanism has a first energy-storing state and a first energy-releasing state. The first energy storage mechanism stores first energy to become the first energy-storing state under an action of an object against the base. The first latch mechanism has a first latch state and a first loose state for respectively latching and loosing the variable speed transmission mechanism such that the variable speed transmission mechanism is in the first state and the second state, respectively. The first latch state of the first latch mechanism enables the variable speed transmission mechanism to be in the first state, and the first loose state of the first latch mechanism enables the variable speed transmission mechanism to be in the second state.

The transmission device may further include a second energy storage mechanism and a second latch mechanism. The second energy storage mechanism is mounted on the variable speed transmission mechanism and has a second energy-storing state corresponding to the first energy-releasing state and a second energy-releasing state corresponding to the first energy-storing state. The second energy storage mechanism stores energy in the second state and releases energy in the first state. The second latch mechanism is mounted on the base and has a second latch state and a second loose state for respectively latching and loosing the variable speed transmission mechanism such that the variable speed transmission mechanism is in the second state and the first state, respectively. The second latch state of the second latch mechanism enables the variable speed transmission mechanism to be in the second state. The second loose state of the second latch mechanism enables the variable speed transmission mechanism to be in the first state.

Consequently, it is possible to provide a transmission device capable of changing speed with stored energy without the action of extra drive power of a motor or manpower.

DETAILED DESCRIPTION OF THE INVENTION

Figure 1:
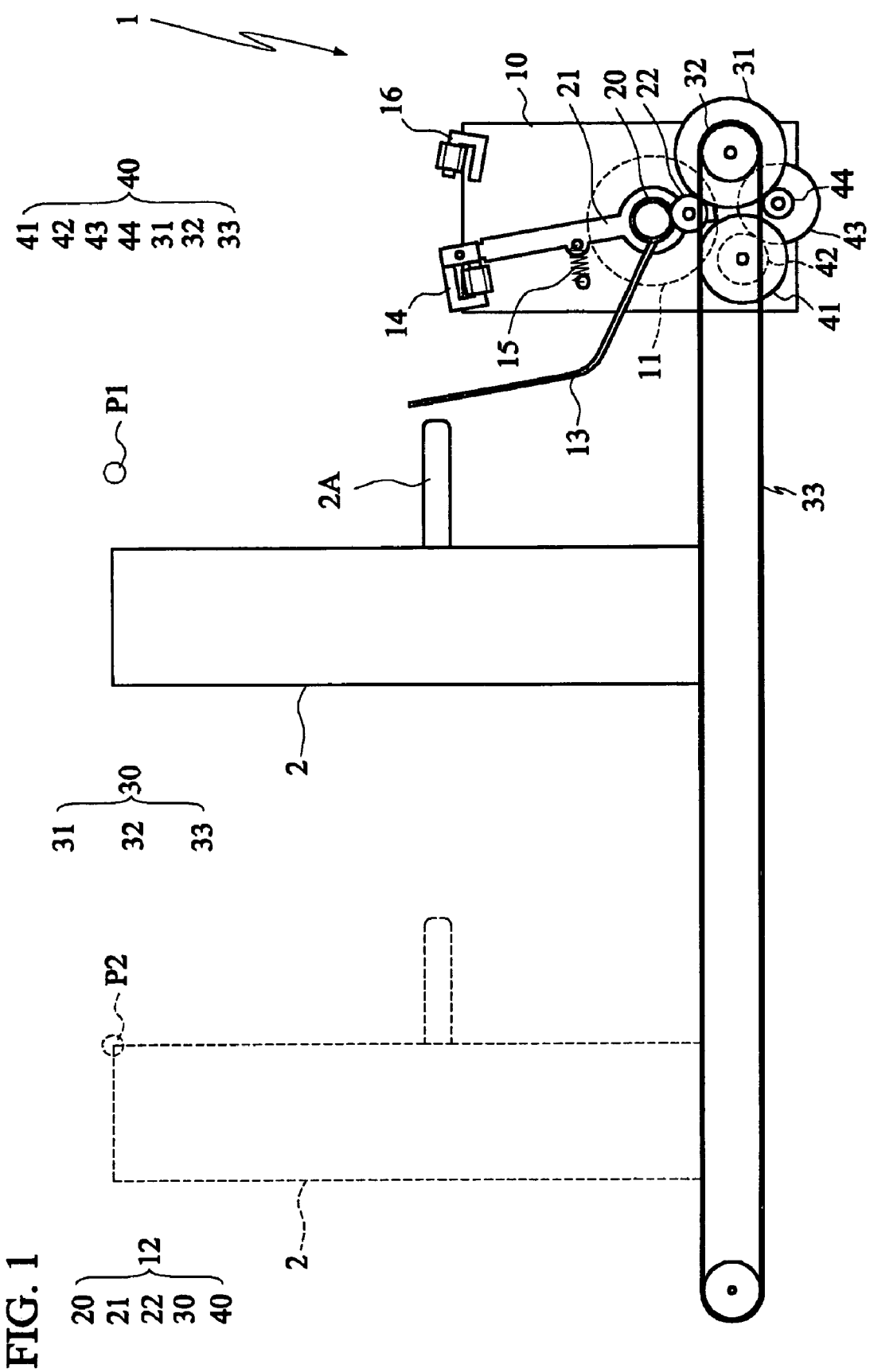
FIG. 1 is a schematic illustration showing a scanning device equipped with a transmission device according to a first embodiment of the invention.
Figure 2:
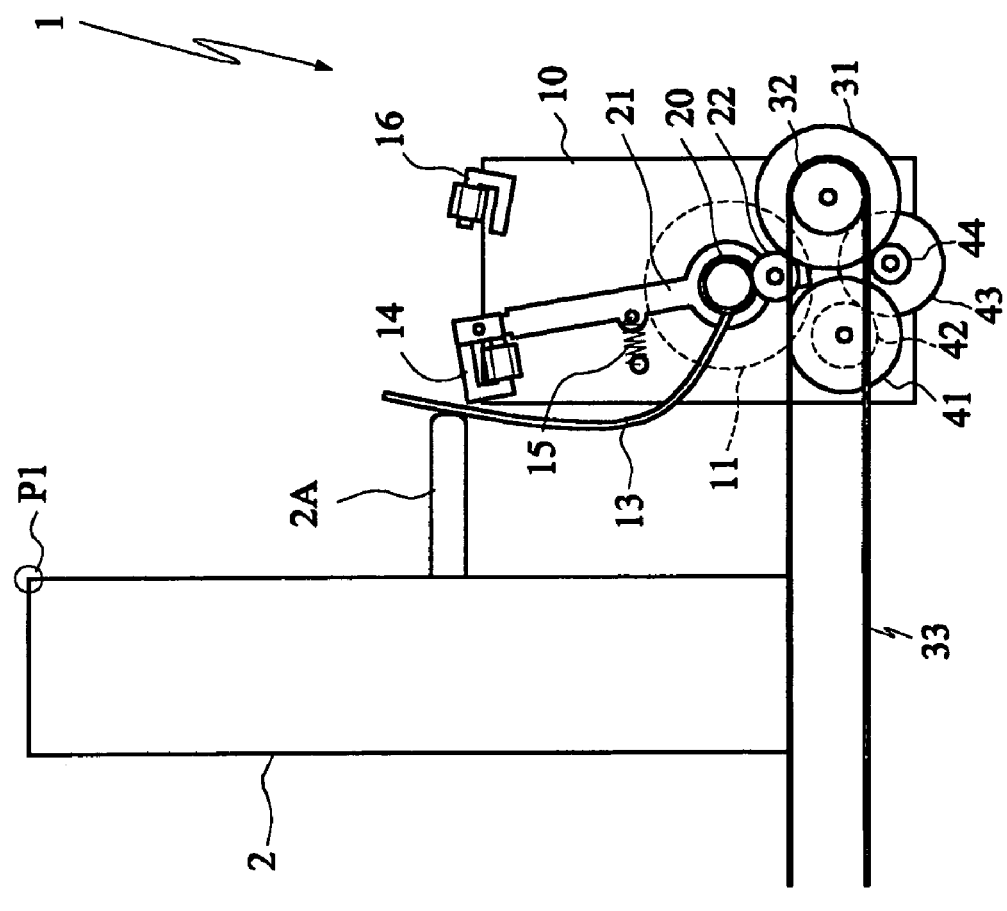
FIG. 2 is a partially schematic illustration showing a first state of FIG. 1.
Figure 3:
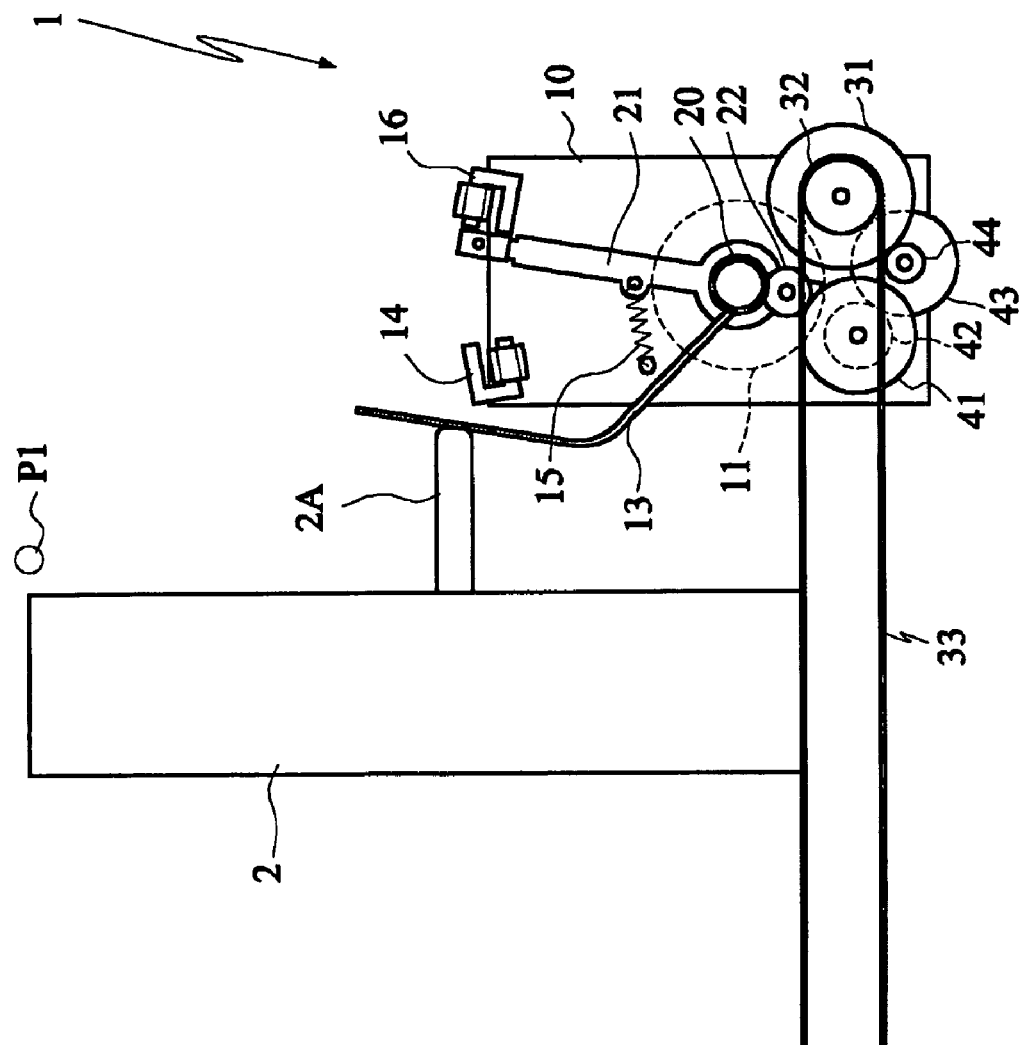
FIG. 3 is a partially schematic illustration showing a second state of FIG. 1.

FIGS. 1 to 3 are schematic illustrations showing a scanning device equipped with a transmission device according to a first embodiment of the invention. As shown in FIGS. 1 to 3, a transmission device 1 capable of changing speed with stored energy according to the first embodiment of the invention is used in the scanning device to drive a scanning module of the scanning device to move back and forth and to scan an image of a document. Also, the transmission device 1 may be used in other apparatus to drive a carriage 2 to move back and forth between a first position P1 and a second position P2. The reasons why the scanning device needs the variable speed transmission device will be described in the following. The first reason is that different moving speeds of the scanning module are required during the document scanning processes with different resolutions. The second reason is that a higher speed is required so that the carriage 2 can be moved faster in the return process after the document has been scanned.

The transmission device 1 includes a base 10, a motor 11, a variable speed transmission mechanism 12, a first energy storage mechanism 13 and a first latch mechanism 14. The motor 11 is mounted on the base 10. The variable speed transmission mechanism 12 is mounted on the base 10 and is driven by the motor 11.

The variable speed transmission mechanism 12 has a first state (FIGS. 1 and 2) for moving the carriage 2 with a first speed, and a second state (FIG. 3) for moving the carriage 2 with a second speed. The first state and the first speed are different from the second state and the second speed, respectively. That is, the variable speed transmission mechanism 12 may have, for example, two different gear ratios.

The variable speed transmission mechanism 12 includes a driving gear 20, a rocker arm 21, an idle gear 22, a first transmission mechanism 30 and a second transmission mechanism 40. The motor 11 rotates the driving gear 20. The rocker arm 21 coaxial with the driving gear 20 can rotate about a center axis of the driving gear 20 and swing between a third state (FIGS. 1 and 2) corresponding to the first state and a fourth state (FIG. 3) corresponding to the second state. The idle gear 22 is attached to the rocker arm 21 and in contact with the driving gear 20, and is rotated by the driving gear 20.

The first transmission mechanism 30 contacts the idle gear 22 on the rocker arm 21 in the third state so as to move the carriage 2 with the first speed. The first transmission mechanism 30 includes a belt 33 and a first gear 31 and a pulley 32 coaxial with the first gear 31. The first gear 31 engages with the idle gear 22 in the first state. The pulley 32 drives the belt 33 to move the carriage 2.

The second transmission mechanism 40 contacts the idle gear 22 on the rocker arm 21 in the second state to move the carriage 2 with the second speed. The second transmission mechanism 40 includes a second gear 41 and a third gear 42 coaxial with the second gear 41, a fourth gear 43 and a fifth gear 44 coaxial with the fourth gear 43, the first gear 31 and the pulley 32 coaxial with the first gear 31, and the belt 33. The second gear 41 engages with the idle gear 22 in the second state and is thus rotated by the idle gear 22. The fourth gear 43 engages with the third gear 42. The first gear 31 engages with the fifth gear 44. The belt 33 is driven by the pulley 32 to move the carriage 2. In this embodiment, the first transmission mechanism 30 and the second transmission mechanism 40 have the same output, so the second transmission mechanism 40 also includes the first gear 31, pulley 32 and belt 33 of the first transmission mechanism 30.

The first energy storage mechanism 13, which may be a spring, a weight and a pneumatic cylinder, is mounted on the rocker arm 21 of the variable speed transmission mechanism 12, and has a first energy-storing state (FIG. 2) and a first energy-releasing state (FIG. 3). In the so-called energy-storing state, the first energy storage mechanism 13 absorbs the work caused by the external force and stores the work as the energy in the mechanism 13. In the so-called energy-releasing state, the first energy storage mechanism 13 releases the energy stored therein to do work on an external member. For example, the first energy storage mechanism 13 stores first energy to become the first energy-storing state, as shown in FIG. 2, after a push rod (object) 2A of the base 10 approaches the first position P1 or the carriage 2.

The first latch mechanism 14 may be a solenoid, which is mounted on the base 10 and has a first latch state (FIGS. 1 and 2) and a first loose state (FIG. 3) for respectively latching and loosing the rocker arm 21 of the variable speed transmission mechanism 12 such that the variable speed transmission mechanism 12 is in the first state and the second state, respectively. The first latch state of the first latch mechanism 14 enables the variable speed transmission mechanism 12 to be in the first state. The first loose state of the first latch mechanism 14 enables the variable speed transmission mechanism 12 to be in the second state.

In order to make the variable speed transmission mechanism 12 return from the second state (FIG. 3) to the first state (FIG. 2), the transmission device 1 further includes a second energy storage mechanism 15 and a second latch mechanism 16. The second energy storage mechanism 15, which may be a spring, a weight and a pneumatic cylinder, is mounted on the rocker arm 21 of the variable speed transmission mechanism 12 and has a second energy-storing state (FIG. 3) corresponding to the first energy-releasing state and a second energy-releasing state (FIGS. 1 and 2) corresponding to the first energy-storing state. The second energy storage mechanism 15 stores energy in the second state and releases energy in the first state. The extra advantage of adding the second energy storage mechanism 15 is that the disposed first latch mechanism 14 and second latch mechanism 16 may have smaller latch forces, and the cost may thus be reduced. The second latch mechanism 16, which may be a solenoid, is mounted on the base 10 and has a second latch state (FIG. 3) and a second loose state (FIGS. 1 and 2) for respectively latching and loosing the rocker arm 21 of the variable speed transmission mechanism 12, such that the variable speed transmission mechanism 12 is in the second state and the first state, respectively. The second latch state of the second latch mechanism 16 enables the variable speed transmission mechanism 12 to be in the second state. The second loose state of the second latch mechanism 16 enables the variable speed transmission mechanism 12 to be in the first state.

In the first embodiment, the carriage 2 is moved, at a second speed (e.g., low speed), from the first position P1 to the second position P2, and the variable speed transmission mechanism 12 at this time is shown in FIG. 3. Thereafter, the carriage 2 is moved, at a first speed (e.g., high speed), from the second position P2 to the first position P1. This operation manner can satisfy the requirement of the normal scan process. However, when the starting point of the to-be-scanned document (or the starting point to be cropped by the user) is not close to the first position P1, the carriage 2 cannot be moved to the position of the starting point at the high speed and then start to scan at the low speed. To solve this problem, the invention proposes a second embodiment to be described in the following.

Figure 4:
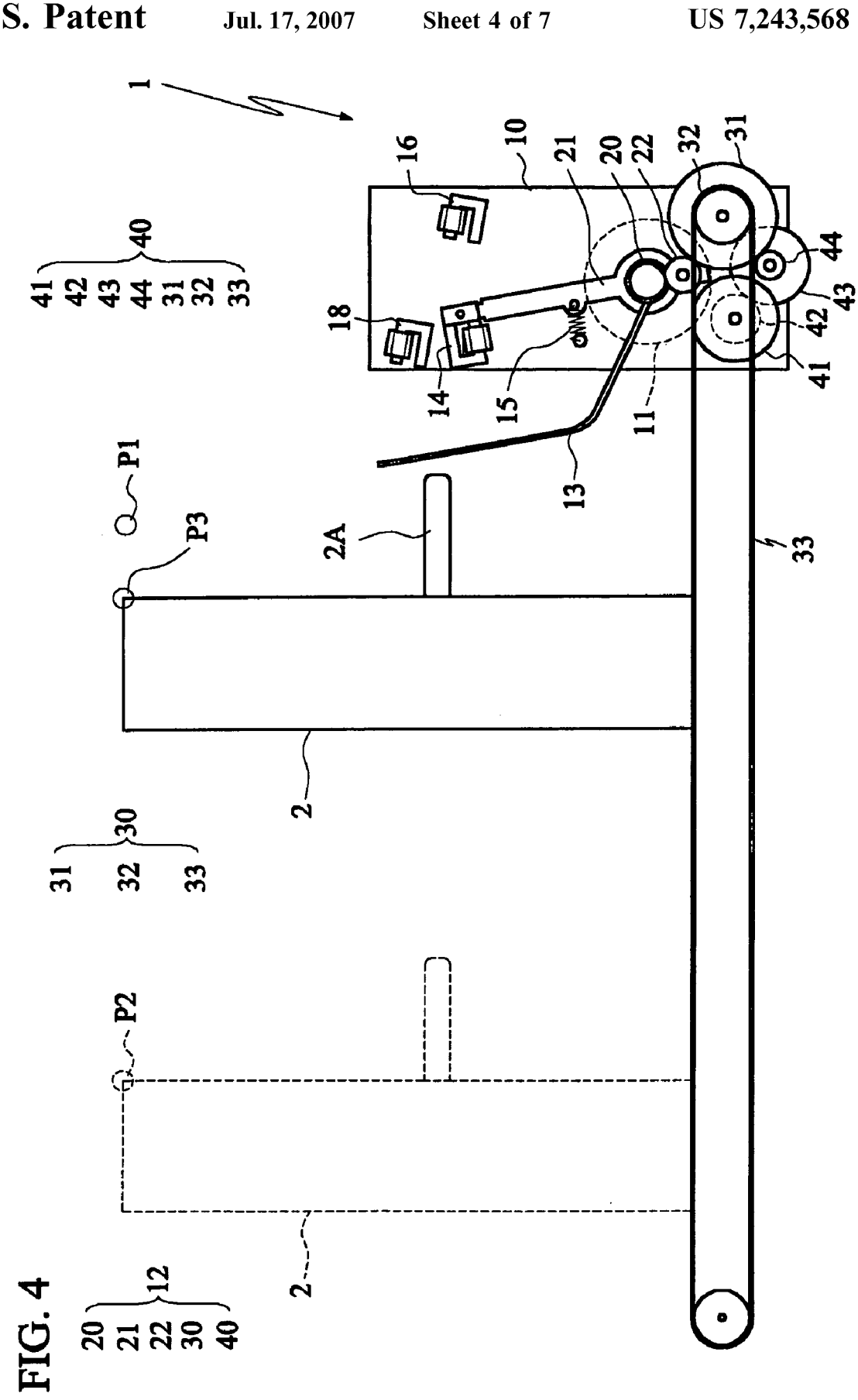
FIG. 4 is a schematic illustration showing a scanning device equipped with a transmission device according to a second embodiment of the invention.
Figure 5:
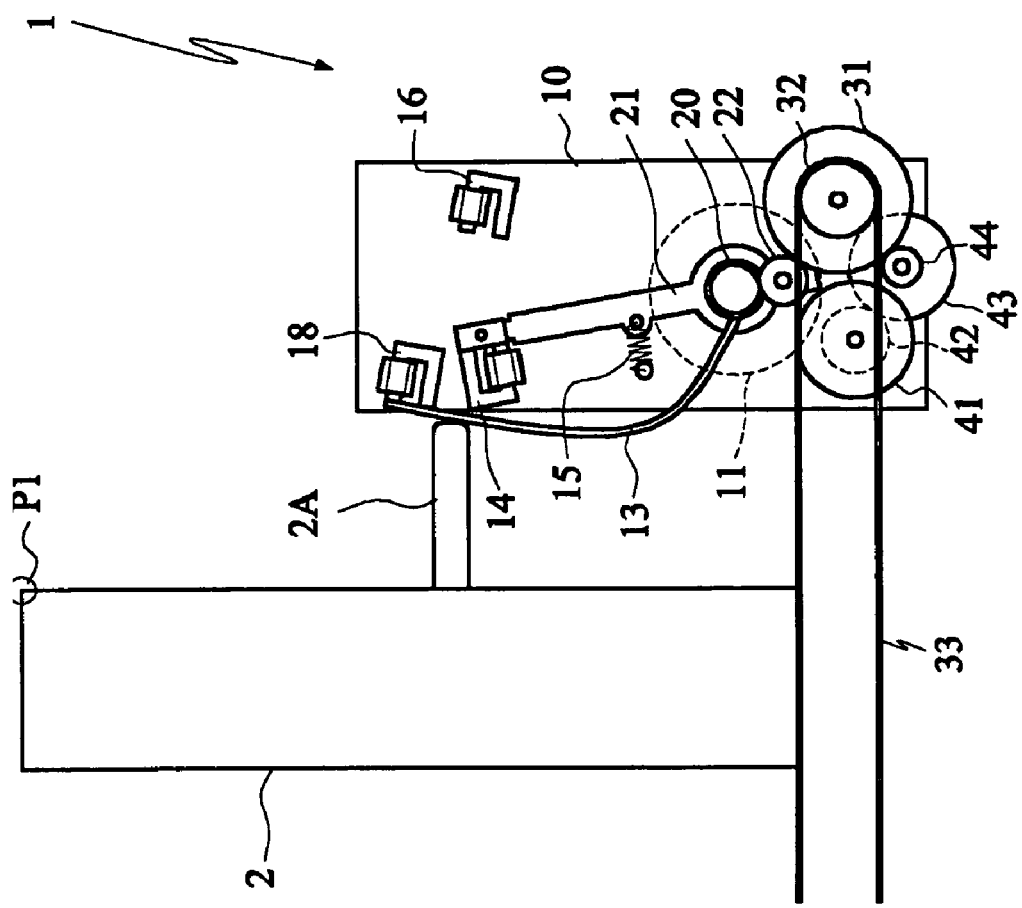
FIG. 5 is a partially schematic illustration showing a first state of FIG. 4.
Figure 6:
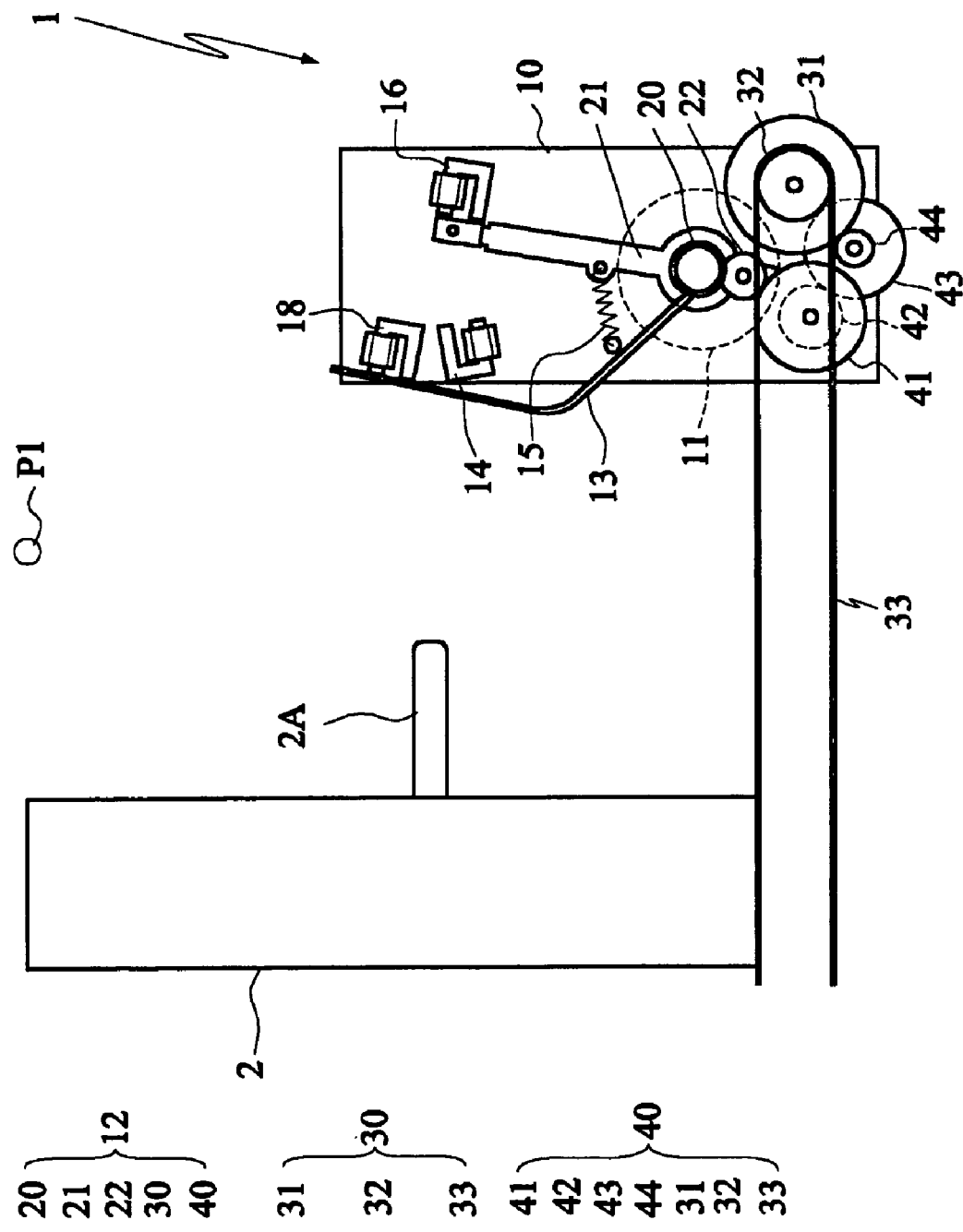
FIG. 6 is a partially schematic illustration showing a second state of FIG. 4.

FIGS. 4 to 6 are schematic illustrations showing a scanning device equipped with a transmission device according to a second embodiment of the invention. As shown in FIGS. 4 to 6, the second embodiment is similar to the first embodiment except for that the transmission device of the second embodiment further includes a third latch mechanism 18, which is mounted on the base 10 and has a third latch state (FIGS. 5 and 6) and a third loose state (FIG. 4) for respectively latching and loosing the first energy storage mechanism 13 such that the first energy storage mechanism 13 is respectively in the first energy-storing state (FIGS. 5 and 6) and the first energy-releasing state (FIG. 4). When the carriage 2 is away from the first energy storage mechanism 13, the third latch mechanism 18 is in the third latch state, the second latch mechanism 16 is in the second loose state, and the first latch mechanism 14 is in the first latch state such that the variable speed transmission mechanism 12 is in the first state. When the carriage 2 is moved to a third position P3 between the first position P1 and the second position P2, the third latch mechanism 18 is in the third latch state, the second latch mechanism 16 is in the second latch state, and the first latch mechanism 14 is in the first loose state such that the variable speed transmission mechanism 12 is in the second state.

In the second embodiment, the carriage 2 may be moved, at a first speed (e.g., high speed), from the first position P1 to the third position P3, and the variable speed transmission mechanism 12 at this time is shown in FIG. 6. Next, the carriage 2 is moved, at a second speed (e.g., low speed), from the third position P3 to the second position P2. Then, the carriage 2 is moved, at the first speed (e.g., high speed), from the second position P2 to the first position P1. When the third latch mechanism 18 is always kept in the third loose state, the function of the second embodiment is completely the same as that of the first embodiment.

Figure 7:
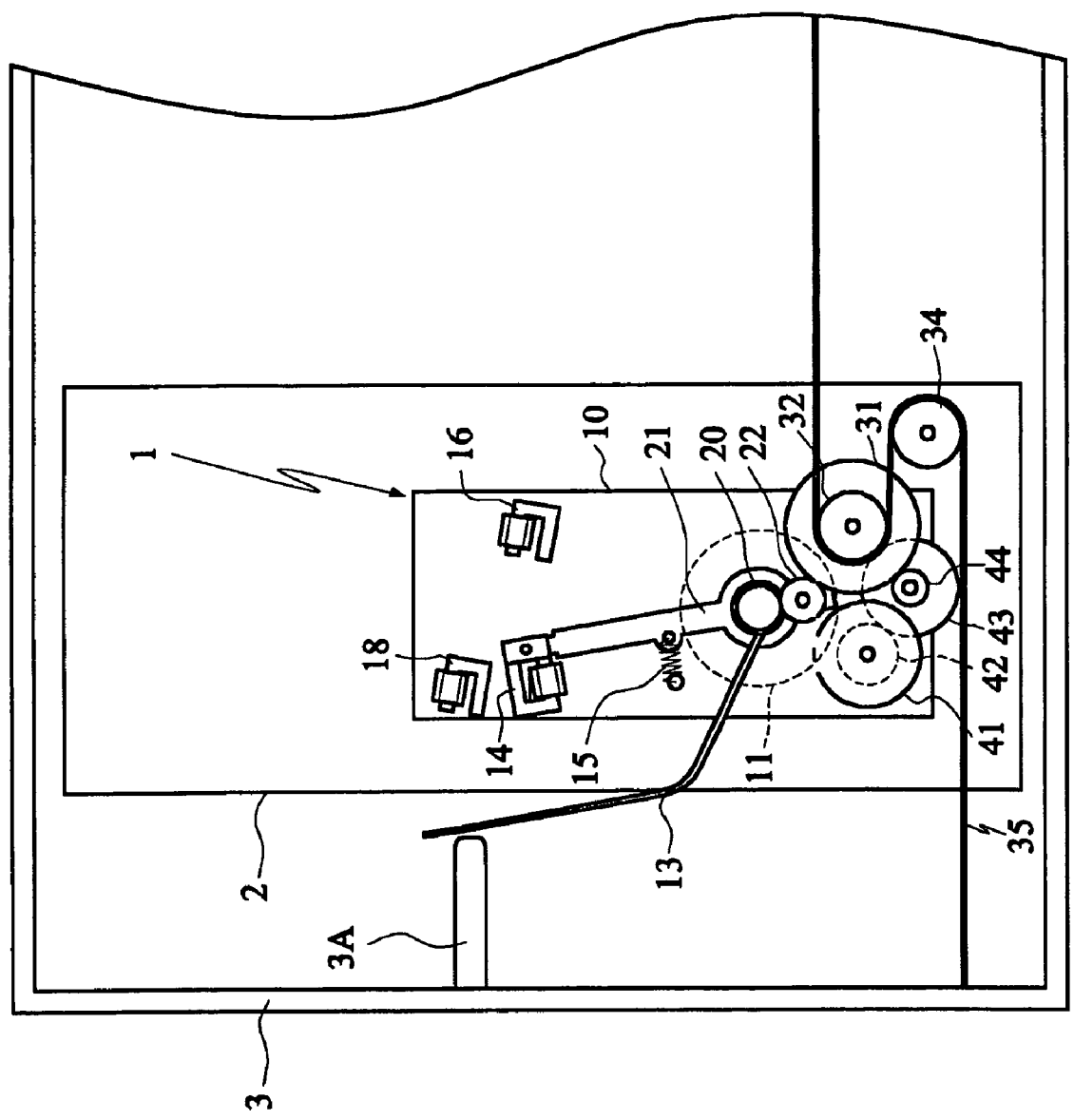
FIG. 7 is a schematic illustration showing a scanning device equipped with a transmission device according to a third embodiment of the invention.

FIG. 7 is a schematic illustration showing a scanning device equipped with a transmission device according to a third embodiment of the invention. As shown in FIG. 7, the embodiment is similar to the second embodiment except for that the overall transmission device 1 is mounted on the carriage 2, and the carriage 2 and the transmission device 1 are accommodated in a housing 3. In addition, a pulley 34 is newly added in this embodiment, and the closed belt 33 is modified into an opened belt 35 to meet the requirement. It is to be noted that the pulley 34 may be mounted on the carriage 2 or the base 10, and the base 10 itself may be a portion of the carriage 2. The so-called self-propelled scanning module in the scanner application may use the architecture of this embodiment. In this embodiment, the transmission device I is also for driving itself and the carriage 2 to move back and forth between a first position and a second position. The first energy storage mechanism 13 stores first energy to become the first energy-storing state after a push rod (object) 3A of the housing 3 approaches the base 10. Thus, the first to third embodiments of the invention may be regarded as that the first energy storage mechanism 13 stores the first energy to become the first energy-storing state under the action of the object (3A or 2A) approaching the base 10.

According to the embodiments of the invention, it is possible to provide a transmission device capable of changing speed with stored energy without the action of extra drive power of a motor or manpower.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A transmission device for driving a carriage to move back and forth between a first position and a second position, the transmission device comprising:
   a base;
   a motor mounted on the base;
   a variable speed transmission mechanism mounted on the base and driven by the motor, wherein the variable speed transmission mechanism has a first state for moving the carriage with a first speed and a second state for moving the carriage with a second speed, and the first state and the first speed are respectively different from the second state and the second speed;
   a first energy storage mechanism, which is mounted on the variable speed transmission mechanism and has a first energy-storing state and a first energy-releasing state, wherein the first energy storage mechanism stores first energy to become the first energy-storing state under an action of an object approaching the base;
   a first latch mechanism, which is mounted on the base and has a first latch state and a first loose state for respectively latching and loosing the variable speed transmission mechanism such that the variable speed transmission mechanism is respectively in the first state and the second state, wherein the first latch state of the first latch mechanism enables the variable speed transmission mechanism to be in the first state, and the first loose state of the first latch mechanism enables the variable speed transmission mechanism to be in the second state;
   a second energy storage mechanism, which is mounted on the variable speed transmission mechanism and has a second energy-storing state corresponding to the first energy-releasing state and a second energy-releasing state corresponding to the first energy-storing state, wherein the second energy storage mechanism stores energy in the second state and releases energy in the first state; and
   a second latch mechanism, which is mounted on the base and has a second latch state and a second loose state for respectively latching and loosing the variable speed transmission mechanism such that the variable speed transmission mechanism is in the second state and the first state, respectively, wherein the second latch state of the second latch mechanism enables the variable speed transmission mechanism to be in the second state, and the second loose state of the second latch mechanism enables the variable speed transmission mechanism to be in the first state.

2. The device according to claim 1, wherein the object is the carriage.

3. The device according to claim 1, wherein the variable speed transmission mechanism comprises:
   a driving gear rotated by the motor;
   a rocker arm, which is coaxial with the driving gear and can swing between a third state corresponding to the first state and a fourth state corresponding to the second state;
   an idle gear, which is attached to the rocker arm and in contact with the driving gear;
   a first transmission mechanism, which contacts the idle gear on the rocker arm in the third state and moves the carriage with the first speed; and
   a second transmission mechanism, which contacts the idle gear on the rocker arm in the second state and moves the carriage with the second speed.

4. The device according to claim 3, wherein the first transmission mechanism and the second transmission mechanism have the same output.

5. The device according to claim 4, wherein the first transmission mechanism comprises:
   a first gear and a pulley coaxial with the first gear, wherein the first gear engages with the idle gear in the first state; and
   a belt driven by the pulley to move the carriage.

6. The device according to claim 5, wherein the second transmission mechanism comprises:
   a second gear and a third gear coaxial with the second gear, wherein the second gear engages with the idle gear in the second state;
   a fourth gear and a fifth gear coaxial with the fourth gear, wherein the fourth gear engages with the third gear;
   the first gear and the pulley coaxial with the first gear, wherein the first gear engages with the fifth gear; and
   the belt driven by the pulley to move the carriage.

7. The device according to claim 1, wherein each of the first and second energy storage mechanisms is selected from one of the group consisting of a spring, a weight and a pneumatic cylinder.

8. The device according to claim 1, wherein each of the first and second latch mechanisms is a solenoid.

9. The device according to claim 1, further comprising:

a third latch mechanism, which is mounted on the base and has a third latch state and a third loose state for respectively latching and loosing the first energy storage mechanism such that the first energy storage mechanism is in the first energy-storing state and the first energy-releasing state, respectively, wherein when the carriage is away from the first energy storage mechanism, the third latch mechanism is in the third latch state, the second latch mechanism is in the second loose state and the first latch mechanism is in the first latch state, such that the variable speed transmission mechanism is in the first state; and when the carriage is moved to a third position between the first position and the second position, the third latch mechanism is in the third latch state, the second latch mechanism is in the second latch state and the first latch mechanism is in the first loose state, such that the variable speed transmission mechanism is in the second state.

10. The device according to claim 1, wherein the carriage is a scanning module for scanning an image of a document.

11. The device according to claim 1, wherein the base is mounted on the carriage, and the object is a housing for accommodating one of the carriage and the transmission device.

* * * * *